United States Patent
Jones et al.

(10) Patent No.: US 6,560,973 B2
(45) Date of Patent: May 13, 2003

(54) METHOD FOR MANUFACTURING A VENDING MACHINE FOR SERVING EXTREMELY COLD FROZEN PRODUCT AND METHOD FOR DISTRIBUTING SAME

(75) Inventors: Curt D. Jones, Paducah, KY (US); Stan Jones, Vienna, IL (US); Thomas G. Timmons, Benton, KY (US)

(73) Assignee: Dippin' Dots, Inc., Peducah, KY (US)

( * ) Notice: Subject to any disclaimer, the term of this patent is extended or adjusted under 35 U.S.C. 154(b) by 0 days.

(21) Appl. No.: 10/215,525

(22) Filed: Aug. 8, 2002

(65) Prior Publication Data

US 2002/0189268 A1 Dec. 19, 2002

Related U.S. Application Data

(60) Continuation of application No. 09/938,059, filed on Sep. 21, 2001, now Pat. No. 6,481,226, which is a division of application No. 09/596,596, filed on Jun. 19, 2000, now Pat. No. 6,308,522.
(60) Provisional application No. 60/140,333, filed on Jun. 21, 1999.

(51) Int. Cl.[7] .............................................. B65B 63/08
(52) U.S. Cl. ................................ 62/60; 62/63; 62/371
(58) Field of Search ................................ 62/60, 63, 74, 62/371

(56) References Cited

U.S. PATENT DOCUMENTS

| | | | |
|---|---|---|---|
| 4,009,740 A | 3/1977 | Michielli | 141/172 |
| 4,509,339 A | 4/1985 | Mehlan et al. | 62/450 |
| 4,730,750 A | 3/1988 | Ficken | 221/124 |
| 4,741,178 A | 5/1988 | Fujiu et al. | 62/525 |
| 4,831,841 A | 5/1989 | Falk | 62/381 |
| 4,920,764 A | 5/1990 | Martin | 62/259 |
| 5,027,698 A | 7/1991 | Chirnomas | 99/450 |
| 5,121,854 A | 6/1992 | Trouteaud et al. | 221/15 |
| 5,207,073 A | * 5/1993 | Maier-Laxhuber et al. | 62/269 |
| 5,224,415 A | 7/1993 | McFadden et al. | 99/357 |
| 5,281,429 A | 1/1994 | Zevlakis | 426/389 |
| 5,293,756 A | * 3/1994 | Nelson et al. | 62/292 |
| 5,305,615 A | 4/1994 | McFadden et al. | 62/378 |
| 5,319,939 A | * 6/1994 | McFadden et al. | 62/63 |
| 5,400,614 A | 3/1995 | Feola | 62/233 |
| 5,405,054 A | 4/1995 | Thomas | 222/95 |
| 5,417,081 A | 5/1995 | Rudick et al. | 62/440 |
| 5,421,484 A | 6/1995 | Beach | 222/95 |
| 5,463,878 A | 11/1995 | Parekh et al. | 62/394 |

(List continued on next page.)

Primary Examiner—William E. Tapolcai
Assistant Examiner—Mohammad M. Ali
(74) Attorney, Agent, or Firm—Thomas, Kayden, Horstemeyer & Risley

(57) ABSTRACT

The present invention is generally directed to a method for modifying a vending machine to provide a vending machine for storing product at a temperature no greater than −40 degrees Celsius. The method of the invention includes the steps of replacing an existing refrigeration compressor with a different compressor having a higher compression and replacing an existing refrigerant with a more efficient refrigerant. Then, the length of an existing capillary tube was increased (preferably to approximately 21 inches). Finally, a new thermostat capable of achieving a −40 Celsius set point. In addition, in the preferred embodiment, the pre-existing thermostat was rewired into a safety switch, which is operable to disable the vending machine from dispensing product if the temperature exceeds the set point. A novel business method is also provided; namely a method of manufacturing and distributing ice cream. In accordance with this method, a novelty ice cream product is manufactured to take on a beaded and free-flowing form. This ice cream product is then shipped and distributed through vending machines capable of maintaining temperatures sufficiently cold to preserve the beaded and free-flowing form of the ice cream product.

11 Claims, 6 Drawing Sheets

U.S. PATENT DOCUMENTS

| | | | |
|---|---|---|---|
| 5,557,944 A | 9/1996 | Hirano et al. | 62/469 |
| 5,664,422 A * | 9/1997 | Jones | 62/64 |
| 5,704,216 A | 1/1998 | Hirano et al. | 62/114 |
| 5,718,119 A | 2/1998 | Wakita et al. | 62/85 |
| 5,772,072 A | 6/1998 | Prescott et al. | 221/121 |
| 5,842,349 A | 12/1998 | Wakita et al. | 62/85 |
| 6,308,522 B1 | 10/2002 | Jones et al. | 62/114 |

\* cited by examiner

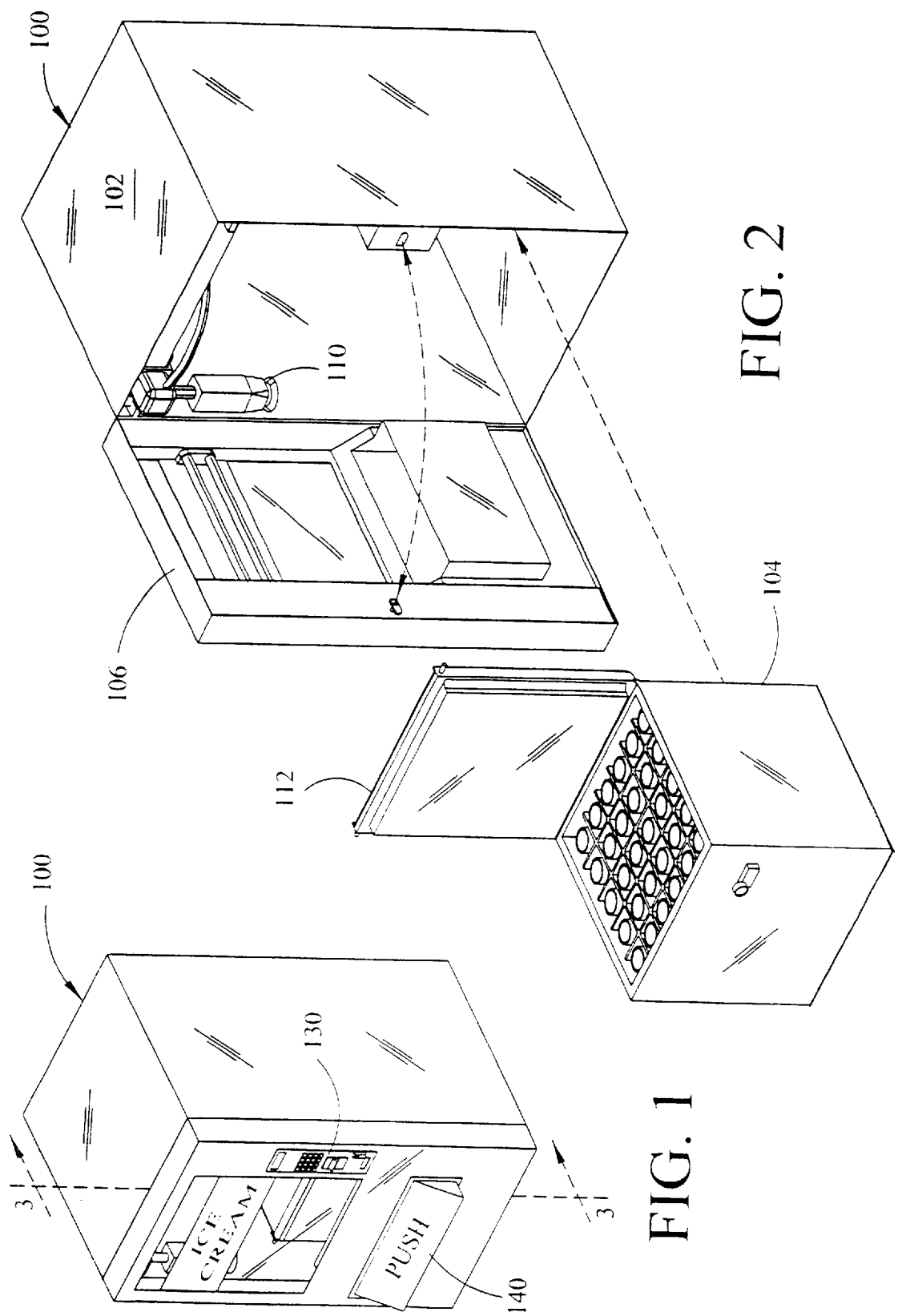

METHOD FOR MANUFACTURING A VENDING MACHINE FOR SERVING EXTREMELY COLD FROZEN PRODUCT AND METHOD FOR DISTRIBUTING SAME

CROSS-REFERENCE TO RELATED APPLICATIONS

This is a continuation of U.S. patent application 09/938,059, filed on Sep. 21, 2001, now U.S. Pat. No. 6,481,226 which was a division of U.S. patent application Ser. No. 09/596,596, filed on Jun. 9, 2000, now U.S. Pat. No. 6,308,522, which claimed the benefit of U.S. provisional patent application Serial No. 60/140,333, filed Jun. 21, 1999.

FIELD OF THE INVENTION

The present invention relates generally to a frozen product dispensing methods and apparatus and, more particularly, to a method for modifying a vending machine for serving an extremely cold frozen product.

DESCRIPTION OF THE PRIOR ART

Vending machines are known for dispensing ice cream and other frozen product. However, the temperatures maintained by such machines vary, and are often slightly below freezing. Certain frozen product, however, must be maintained at temperatures well below freezing. Indeed some product may be maintained at temperatures well below zero.

For example, one such product that is marketed by the Applicant herein is a unique novelty ice cream, frozen yogurt, and ice product in the form of beads. This product, marketed under the trademarks "Dippin' Dots®" and "Ice Cream of the Future®", has become very popular in specialty stores and at fairs and theme parks. Indeed, the Applicant has proprietary rights in the method of preparing and storing the product pursuant to U.S. Pat. No. 5,126,156, issued Jun. 30, 1992, herein incorporated by reference, as well as rights associated with improvements pursuant to U.S. Pat. No. 5,664,422, issued Sep. 9, 1997, and U.S. Pat. No. 6,000,229, issued Dec. 14, 1999, both of which are herein incorporated by reference. As is generally described therein, the patented method involves delivering flavored liquid dairy and other alimentary compositions to a feed tray and then dripping the composition into a freezing chamber. The feed tray comprises a plurality of orifices through which liquid composition passes so that droplets form and fall into the freezing chamber. Each orifice may also have a corresponding feed dropper, which is downwardly disposed in relation to the tray such that the liquid composition passes from the tray through an orifice and then through an associated feed dropper where a droplet is formed. The orifices or combination of orifices and feed droppers will hereinafter be referred to collectively as feed assemblies.

The falling droplets of liquid composition freeze rapidly in the freezing chamber due to the presence of both gaseous and liquid refrigerant in the area between the orifices and the bottom of the freezing chamber, thereby forming solid beads of flavored ice cream, yogurt or other alimentary products, such as flavored ice. The frozen beads are removed from the freezing chamber and packed for distribution and later consumption. It is important that the frozen beads be stored (throughout the period from the time of initial manufacture to the time of serving) at temperatures well below freezing, so that the frozen beads do not tend to fuse together. Therefore, when served, the beads maintain a distinct granularity, which has been deemed highly desirable in the product.

In order to capture further markets and expand further into certain markets, it is desired to market the product through additional channels. One such channel is through vending machines. A problem, however, has been encountered in attempting to penetrate this market. Specifically, the vending machines known by Applicant do not maintain temperatures cold enough to preserve the integrity of Applicant's frozen beaded ice cream product.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method for modifying a vending machine to provide a vending machine for storing product at a temperature no greater than −40 degrees Celsius. The method of the invention includes the steps of replacing an existing refrigeration compressor with a different compressor having a higher compression and replacing an existing refrigerant with a more efficient refrigerant. Then, the length of an existing capillary tube was increased (preferably to approximately 21 inches). Finally, a new thermostat capable of achieving a −40 Celsius set point. In addition, in the preferred embodiment, the pre-existing thermostat was rewired into a safety switch, which is operable to disable the vending machine from dispensing product if the temperature exceeds the set point.

A novel business method is also provided; namely a method of manufacturing and distributing ice cream. In accordance with this method, a novelty ice cream product is manufactured to take on a beaded and free-flowing form. This ice cream product is then shipped and distributed through vending machines capable of maintaining temperatures sufficiently cold to preserve the beaded and free-flowing form of the ice cream product.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1 is a perspective view of an ice cream vending machine constructed in accordance with the invention;

FIG. 2 is an exploded perspective view of the ice cream vending machine of FIG. 1;

DETAILED DESCRIPTION OF THE PREFERRED EMBODIMENT

Figure 4:
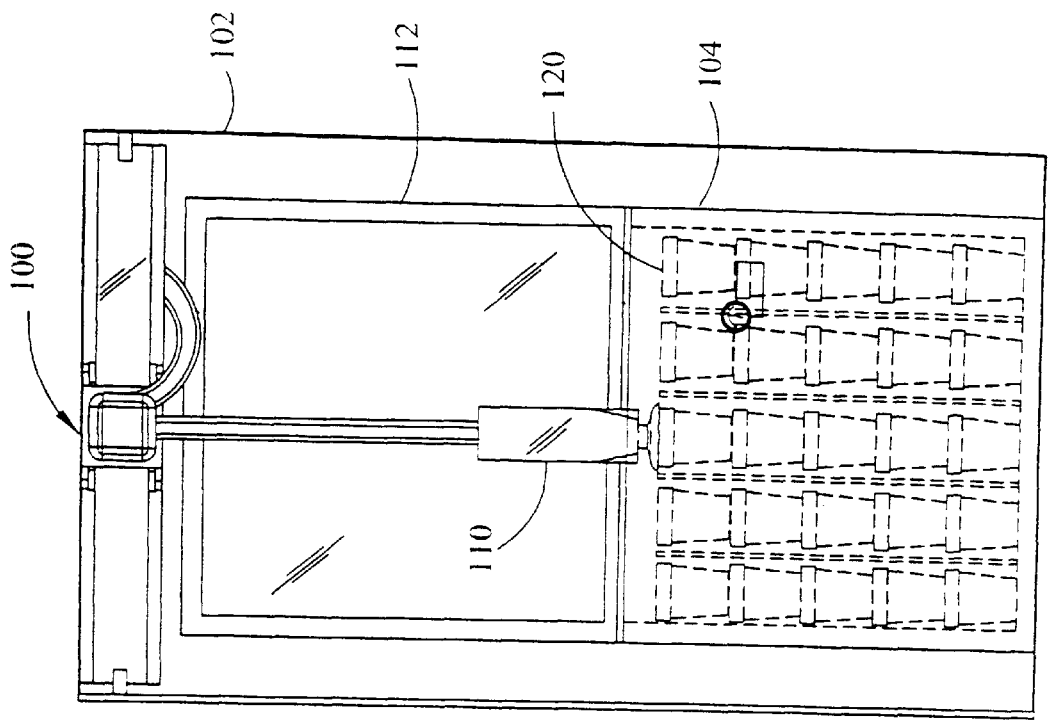
FIG. 4 is a cross-sectional front view, similar to the view of FIG. 3, but depicting the serving arm extended to retrieve an ice cream product.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Accordingly, the present invention is generally directed to an improved vending machine for dispensing frozen product. In accordance with one aspect of the present invention the present invention is directed to a method of modifying an existing vending machine to improve its temperature qualities, and specifically lower the temperatures maintained by the vending machine to an extent heretofore unreached by other frozen product vending machines. FIG. 1 illustrates a perspective view of a vending machine 100, of the type that may be modified in accordance with the invention to vend frozen product.

Reference is now made to FIG. 2, which is to be considered in conjunction with FIG. 1. In this regard, FIG. 2 is an exploded perspective view of the vending machine 100 of FIG. 1. The vending machine 100 is primarily comprised of two parts: a body 102 and a freezer chest 104. The body 102 defines an upright vending machine having an front door 106 that is hinged along one edge for movement between open and closed positions. The door 106 is illustrated in its closed position in FIG. 1, and is illustrated in its open position in FIG. 2. The body 102 of the vending machine 100 defines an interior space or chamber that can be viewed as having an upper portion and a lower portion. The lower portion houses the freezer chest 104, while the upper portion (as better illustrated in FIGS. 3–5) provides a space for a motorized serving our 110 to move. The operation of the serving arm 110 will be described in more detail in connection with FIGS. 3–5 below.

The freezer chest 104 generally operates and a fashion that is well known and refrigeration industry to maintain products toward therein at a very cold temperature. However, in accordance with the present invention, the freezer chest 104 is modified to attain extremely cold temperatures. In the preferred embodiment, the product that must be stored within the freezer chest 104 is a novelty ice cream that require storage temperatures of at least –40 degrees Celsius. To facilitate ordered storage and vending of the product in multiple flavors, the freezer chest 104 includes a matrix of interior partitions that allow multiple servings of the ice cream product to be stored in row-column fashion.

The freezer chest 104 includes a lid 112 that overlies the top of the freezer chest, and is hinged along one edge for movement between open and closed positions. As can be seen in FIG. 1, unless the vending machine 100 is otherwise in operation, the lid 112 of the freezer chest 104 remains and closed position to maintain the temperature within the freezer chest 104 that it's coldest possible temperature. However, when the vending machine is in active operation (i.e., a user has selected a product for dispensing), the lid 112 of the freezer chest is opened by a motor (not shown) so that he motorized serving arm 110 may retrieve and ice cream product from within the freezer chest 104.

Figure 3:
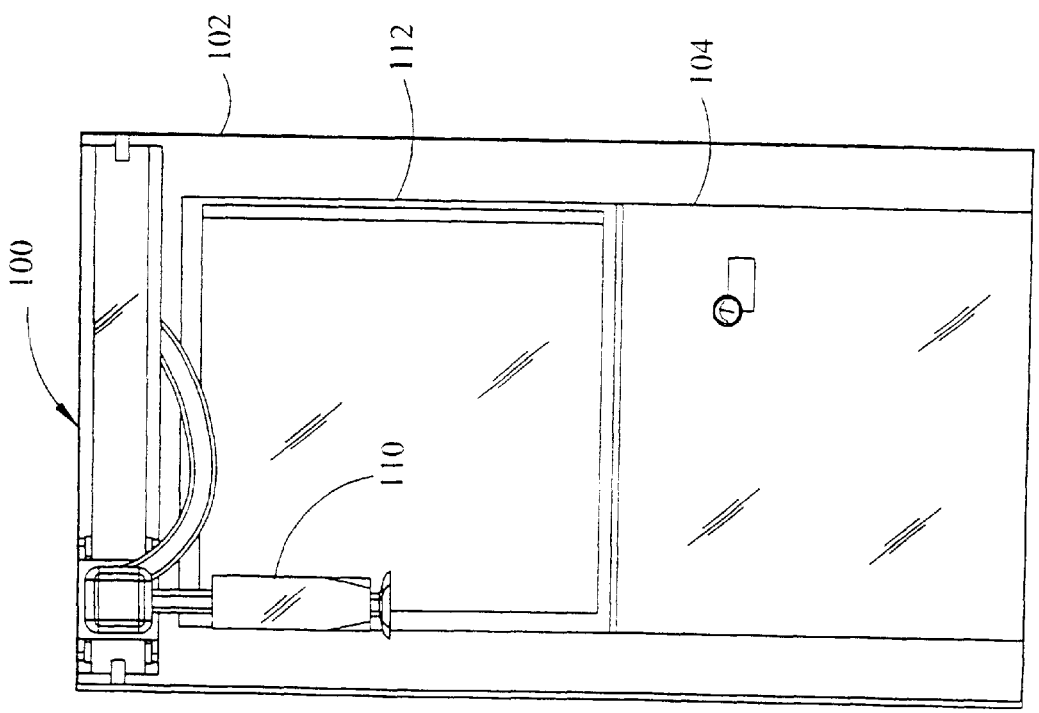
FIG. 3 is a cross-sectional front view, as taken substantially along line 3—3 of FIG. 1, with a serving arm retracted.
Figure 5:
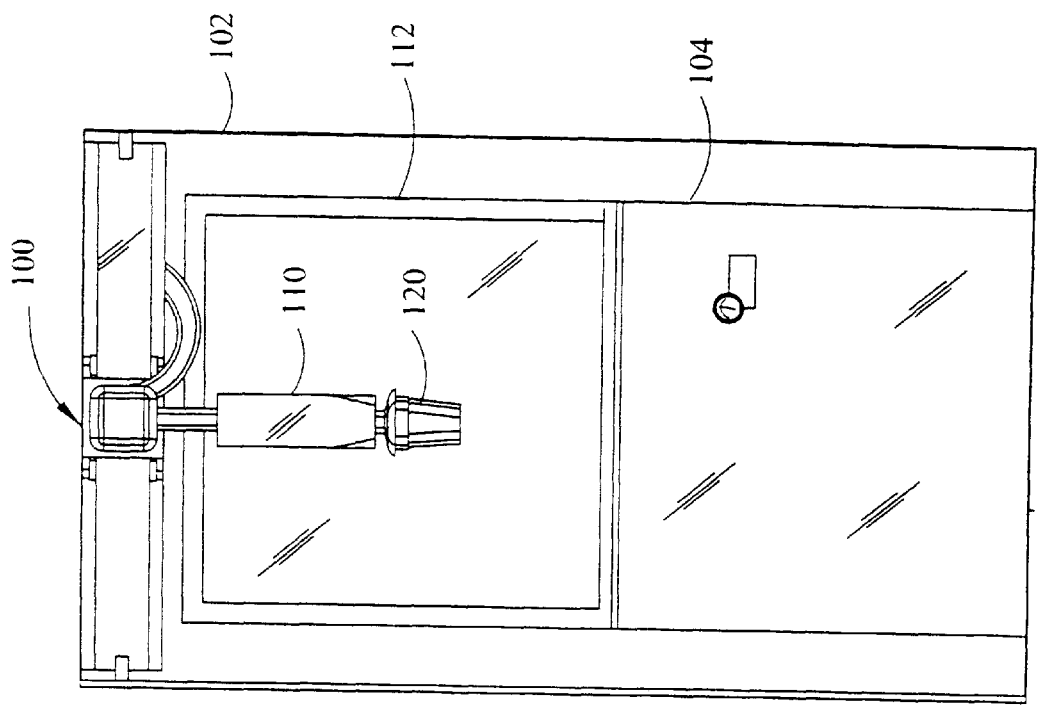
FIG. 5 is a cross-sectional front view, similar to the view of FIG. 3, but depicting the serving arm retracted with a retrieved ice cream product.

To illustrate the dispensing operation of the vending machine 100 of the present invention, reference is now made to FIGS. 3–5, which illustrate a portion of the vending operation of the vending machine 100. FIGS. 3, 4, and 5, reach cross-sectional front views has taken substantially along line 3—3 of FIG. 1. FIG. 3 illustrates the state of the vending machine 100 shortly after payment has been deposited and a product selection made, as from a front panel 130 (FIG. 1) of the vending machine 100. To in this state, the lid 112 of the freezer chest 104 has been moved to its open position. After the lid 112 has been raised to expose the product stored within the freezer chest 104, the serving arm 110 then moves into position to retrieve the selected product. In this regard, many flavors of the product 120 may be available. Separate flavors may be uniquely stored in specific bins within the freezer chest 104. The serving arm 110 may move along tracks and the X and Y directions to align with the storage bin of the selected product. Then, as illustrated in FIG. 4, a the selection arm 110 may be lowered until it comes in contact with a product 120. Then, as illustrated in FIG. 5, the serving our may be retracted, thereby raising the selected product 120 along with it. In this regard, the preferred embodiment of the vending machine 100 will include a vacuum—operated serving arm 110. Accordingly, the product 120 may be retrieved from the freezer chest 104 to the use of vacuum suction. Although not specifically illustrated, once the serving arm 110 has retrieved the selected product from the freezer chest 104, the serving arm may move toward the front of the vending machine 100, where the suction/vacuum may be discontinued allowing the selected product 120 to be dropped into a dispensing tray 140 (FIG. 1), wherein may be retrieved by the user.

The structure and operation of the vending machine 100 as described above should be well appreciated by persons in the vending machine art, and no further description is deemed necessary for an adequate understanding of the basic structure and operation of the vending machine 100 of the present invention.

Figure 6:
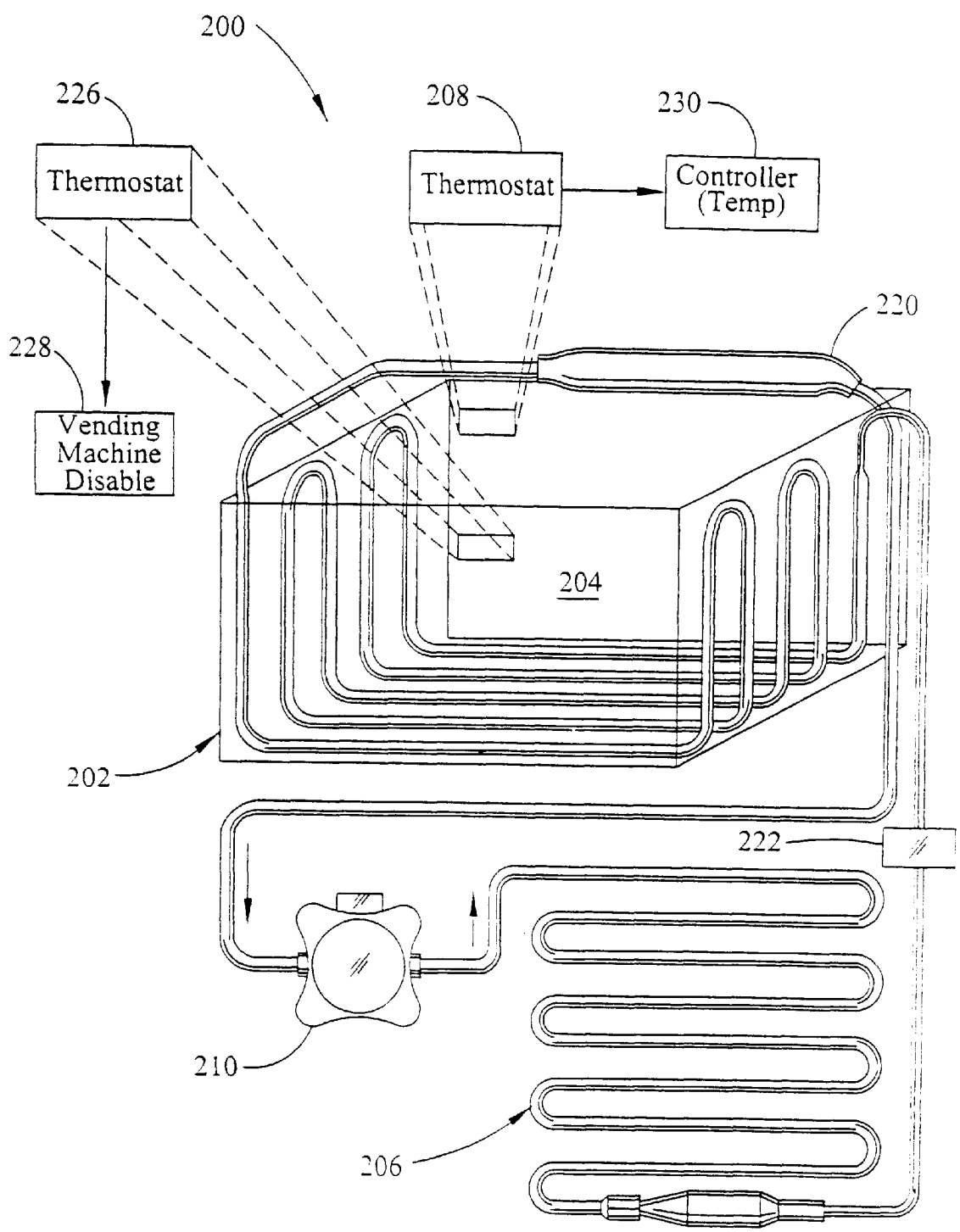
FIG. 6 is a diagram illustrating the primary components of a refrigeration system.

Having described the basic structure and operation of the vending machine 100, reference is made to FIG. 6, which illustrates the basic components and principles involved in refrigeration systems. As is known, the basic principles of refrigeration are derived from the behavior of a suitable fluid when it changes its state from liquid to gas or from gas to liquid. Compressing a gas causes its temperature to rise, and if its temperature is then reduced without reducing the pressure, the gas will liquify. On the other hand, reducing the pressure of liquefied gas will make it vaporize.

In a refrigeration system 200, the refrigerant or working fluid is evaporated in the evaporator 202, which is placed within the refrigerated compartment 204, and the latent heat is drawn from within the compartment, thus reducing its temperature. The working fluid then passes to a condenser unit 206 placed outside the refrigerated compartment 204, where it is condensed back to a liquid. On condensing, it releases its latent heat, which is the heat it absorbed from the refrigerated compartment 204. As the cycle continues, the refrigerant removes heat from the compartment and releases it to the surrounding atmosphere.

The temperature within the refrigerated area is regulated by a thermostat 208, which controls the rate of circulation of the refrigerant, and thus the amount of cooling.

As is further known, there are both absorption systems and compression systems. The compression type of system uses a compressor unit 210 to circulate the refrigerant. This compressor 210 may be belt driven by an electric motor, or may be an integral unit containing an electric motor with a compressor fitted to the end of its shaft. The low-pressure side of the compressor 210 is connected to the evaporator 202 and high-pressure side of the compressor is connected to the condenser 206. The high-pressure refrigerant vapor from the compressor 210 is relatively hot, and is condensed by maintaining the high-pressure and reducing the temperature. The temperature reduction is achieved by cooling the condenser, either by using a fan driven by the compressor motor to force air through it, or by using a water-cooled condenser. On small systems, the heat may simply be dissipated to the atmosphere by means of cooling fins.

The refrigerant passes to the evaporator 202 through a valve that maintains the pressure difference between the condenser and the evaporator. The refrigerant is drawn through the evaporator by the low-pressure created by the condenser, and as it evaporates it absorbs heat from the refrigerated area.

With regard to refrigerants, there are a number of fluids suitable for use as refrigerants in compression systems, including carbon dioxide ($CO_2$) and sulfur dioxide ($SO_2$), but the most useful are the group of halogenated hydrocarbons known as freons, including freon-12 (dichlorodifluoromethane, $CCl_2F_2$), freon-11 (trichloromonofluoromethane, $CCl_3F$), freon-113 (trichlorotrifluoroethane, $C_2Cl_3F_3$), and freon-114 (dichlorotetrafluoroethane, $C_2Cl_2F_4$).

Having set forth the foregoing information regarding refrigeration systems, the preferred embodiment of the present invention was achieved by modifying a premanufactured system. Specifically, a vending machine manufactured by Fastcorp, specifically the Fastcorp model F631 frozen merchandiser, was modified. As is known, the Fastcorp F631 came standard with a product operating storage temperature of approximately −28 degrees Celsius. However, the desired system for the Applicant's frozen product, sought a storage temperature of −40 degrees Celsius.

The first step in one embodiment of the invention was to replace the standard refrigeration compressor 210 with a different compressor having a higher compression. Also, the refrigerant, if different, is replaced with HP 80, an efficient refrigerant. The combination of the higher compression with the new refrigerant realized lower storage temperatures.

In addition, the length of the capillary tube 220 was increased to approximately 21 inches. The capillary tube 220 is a coiled tube that is disposed in-line with the refrigerant line and operates as a metering device, much like an expansion valve. As refrigerant enters the evaporator, the lengthened capillary tube 220 meters the right amount of refrigerant.

In addition, a process port 222 may be installed and used for withdrawing the 134A refrigerant that comes standard in the F631 frozen merchandiser. This same port 222 may also be used to add the HP80 refrigerant.

In the preferred embodiment, a Dan Foss thermostat 208 is installed for achieving the −40 Celsius set point. The thermostat 208 generates an electrical output signal that is indicative of the temperature within the refrigerated chamber 204. This signal is input to a controller 230, which operates to control the circulation of the refrigerant within the refrigerant line, and therefore controls the temperature within the refrigerated chamber 204. The existing thermostat 226 (a Ramco thermostat) is rewired into the control system for a health safety switch 228. The health safety switch 228 disables the unit from vending if the temperature of the storage freezer exceeds the set point.

Figure 7:
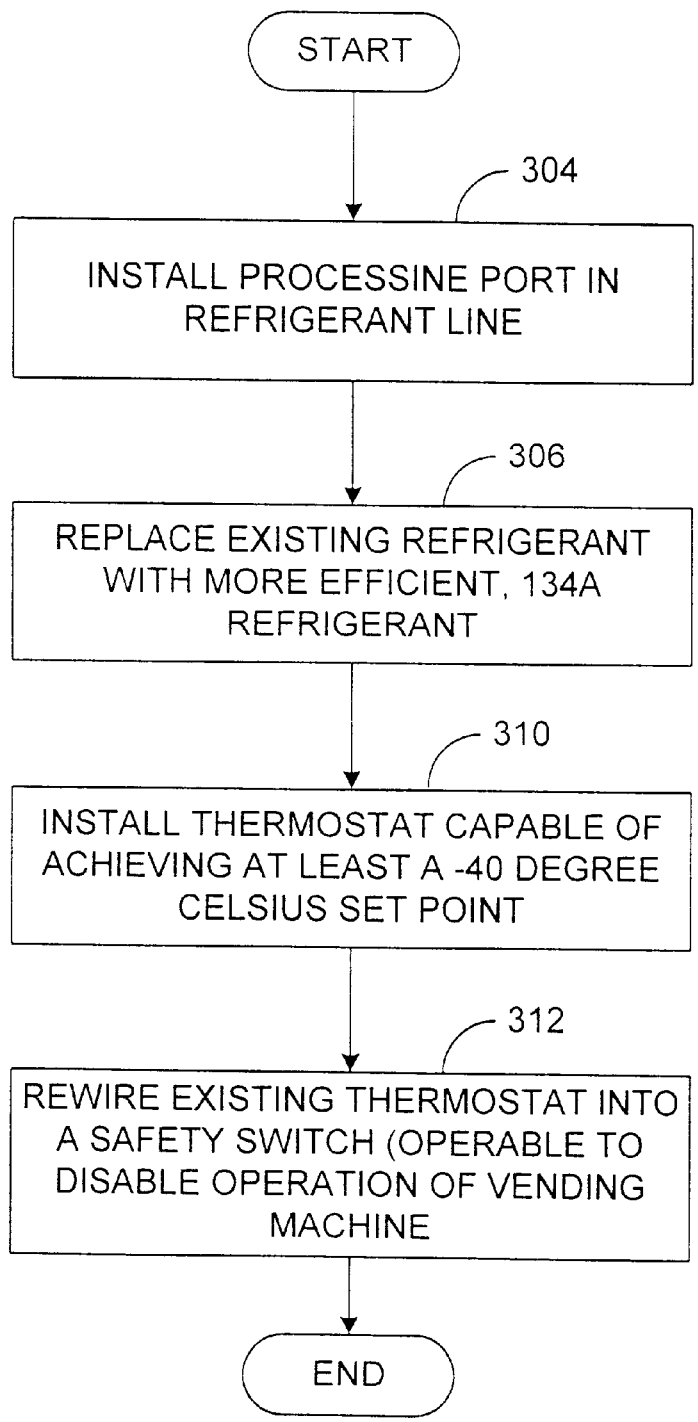
FIG. 7 is a flowchart illustrating the basic steps in the procedure of the present invention, which modifies a commercially-available vending machine to allow it to reach the extremely cold temperatures of the vending machine of the preferred embodiment.

Reference is now made to FIG. 7, which is a flowchart illustrating the principal steps involved in modifying an existing ice cream vending machine to allow the existing machine to reach extremely cold temperatures. As illustrated in FIG. 7, and as mentioned above, a method in accordance with the invention includes the step of installing a processing port in connection with a refrigerant line (step 304). The method then replaces an existing refrigerant (134A) with a more efficient refrigerant by using the processing port (step 306). In the preferred embodiment, the more efficient refrigerant is HP80 refrigerant. An additional thermostat, capable of achieving a −40 Celsius set point, is then installed (step 310). In the preferred embodiment the additional thermostat is a Dan Foss thermostat. Finally, the existing thermostat (a Ramco thermostat) is rewired into a safety switch (step 312). This safety switch operates to disable the vending machine from dispensing product if the temperature within the freezer exceeds the set point.

It should be appreciated that the steps illustrated in FIG. 7 need not be performed in the order illustrated in the figure. Furthermore, consistent with the scope and spirit of the invention, some of the steps may be modified, or even omitted altogether.

Figure 8:
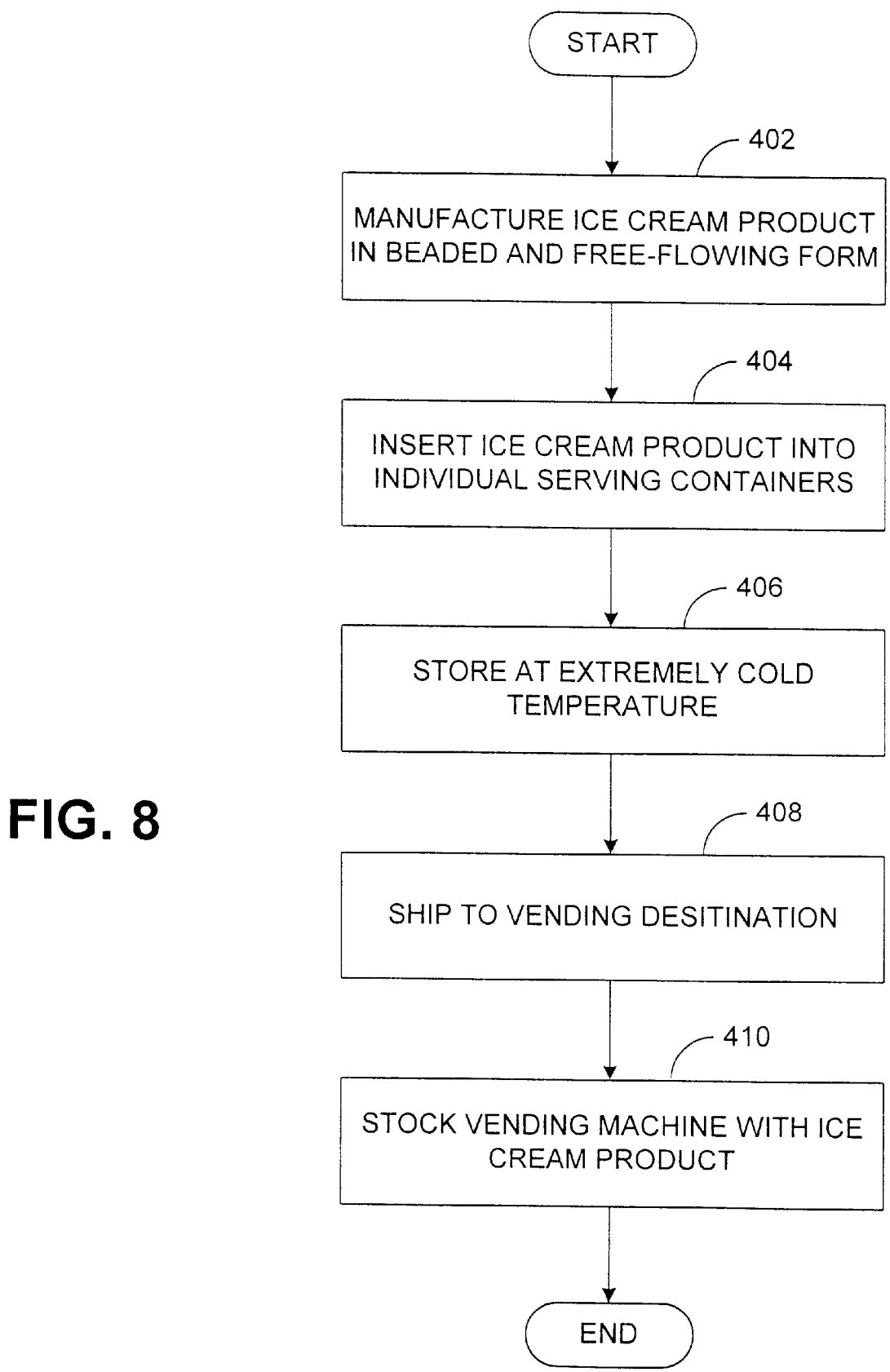
FIG. 8 is a flowchart illustrating steps in a novel method of manufacturing and distributing ice cream, in accordance with one embodiment of the invention.

In accordance with a related aspect of the invention, the present invention provides a novel business method for distributing ice cream. Reference is made to FIG. 8, which illustrates this distribution method. In accordance with the novel business method, a beaded, free-flowing ice cream is manufactured (step 402). This manufacturing step may be carried out in any of a variety of ways, including methods described in U.S. Pat. No. 5,126,156, U.S. Pat. No. 5,664, 422, and U.S. Pat. No. 6,000,229. The beaded ice cream is then injected, inserted, or otherwise placed into individual serving containers (step 404). These containers may be semi-rigid, cylindrically-shaped containers, flexible packets, or other appropriate ice-cream storage containers. The packaged, individual serving ice cream portions are then stored and maintained at extremely cold temperatures (step 406). In this regard, the ice cream is stored a temperatures that are cold enough to prevent the ice cream beads from fusing together. In the preferred embodiment, the storage temperature is maintained a no greater than −40 degrees Celsius.

The stored ice cream and containers are then shipped to vending destination (step 408). The ice cream product may be shipped in freezer units or other appropriate shipping mechanisms to preserve the extremely cold temperature needed to preserve the beaded form of the ice cream. Once at the shipping location, the ice cream product is stocked within a vending machine (step 410). Thereafter, consumers may purchase individual servings of ice cream from the vending machine by inserting money into the vending machine and making a product selection. In accordance with an alternative embodiment, the ice cream may be stocked within a vending machine at the location of manufacture, and then the entire vending machine may be shipped to a vending location.

Preferably, the vending machine is that has been modified according to the method described above. However, consistent with the scope and spirit of the inventive distribution method, the vending machine need only be one capable of maintaining a temperature sufficiently cold to preserve the beaded and free-flowing form of the ice cream product. For example, in an alternative embodiment, a higher capacity compressor may also be installed in place of the original compressor. Also, the capillary tube may be increased to approximately 21 inches.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for manufacturing and distributing an ice cream product comprising:

manufacturing an ice cream product in a beaded form;

packaging the beaded ice cream product in individual serving containers;

transferring the beaded ice cream product into a vending machine; and shipping the vending machine and beaded ice cream product to a vending destination.

2. A method for manufacturing and distributing an ice cream product comprising:

manufacturing an ice cream product in a beaded form;

packaging the beaded ice cream product in individual serving containers;

transferring the individual serving containers into a transport mechanism capable of maintaining the beaded ice cream product in frozen form;

shipping the transport mechanism to a vending machine that is capable of dispensing the individual serving containers; and stocking the vending machine with the individual serving containers.

3. The method of claim 2, wherein the step of transferring more specifically includes transferring the individual serving containers into an insulated container packet with dry ice.

4. The method of claim 2, wherein the step of transferring more specifically includes transferring the individual serving containers into a freezer.

5. The method of claim 2, wherein the step of stocking the vending machine more specifically includes placing the transport mechanism into the vending machine.

6. The method of claim 2, wherein the step of stocking the vending machine more specifically includes transferring individual serving containers from the transport mechanism into a freezer already disposed within the vending machine.

7. A method for manufacturing and distributing an ice cream product comprising:

manufacturing a frozen product in a beaded form;

transferring the frozen product to a vending machine; and dispensing a individual serving containers of the frozen product from the vending machine.

8. The method of claim 7, further including the step of packaging the beaded ice cream product in individual serving containers, before transferring the frozen product to a vending machine.

9. The method of claim 7, further including the step of transporting the vending machine to a dispensing location, after the step of transferring the frozen product into the vending machine.

10. The method of claim 7, further including the step of transporting the frozen product to a dispensing location, before the step of transferring the frozen product into the vending machine.

11. The method of claim 7, wherein the frozen product is an ice cream product.

* * * * *